UNITED STATES PATENT OFFICE.

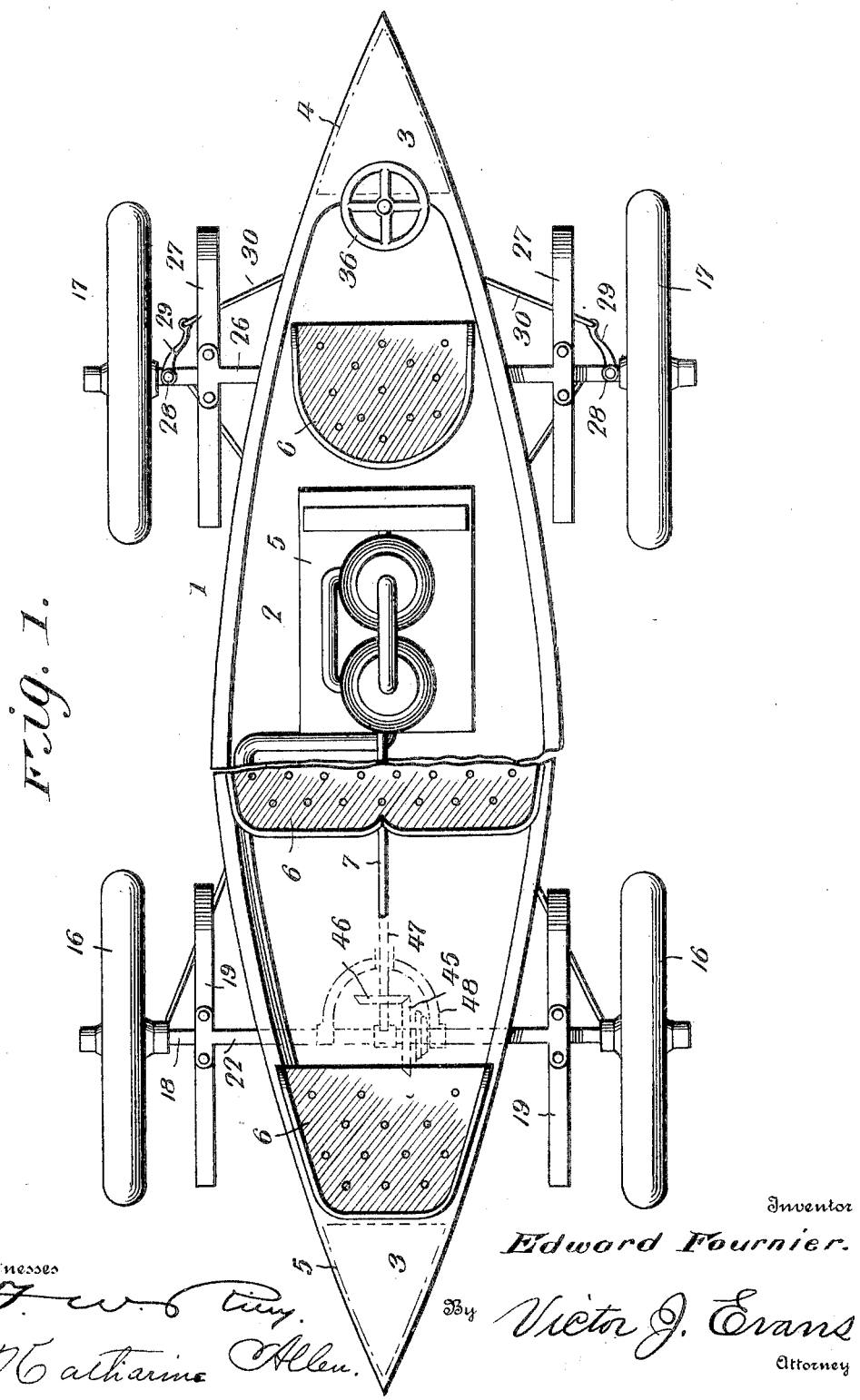

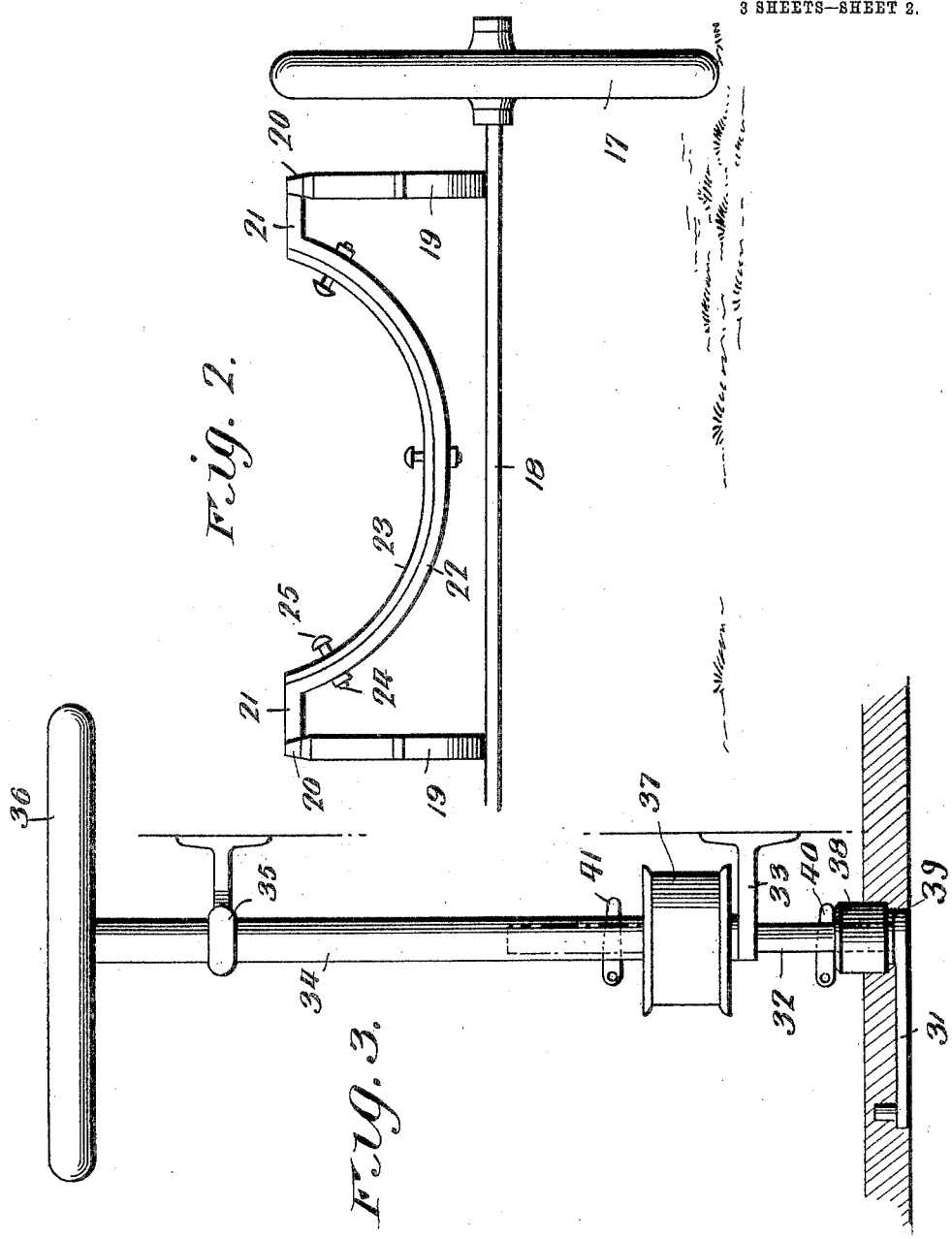

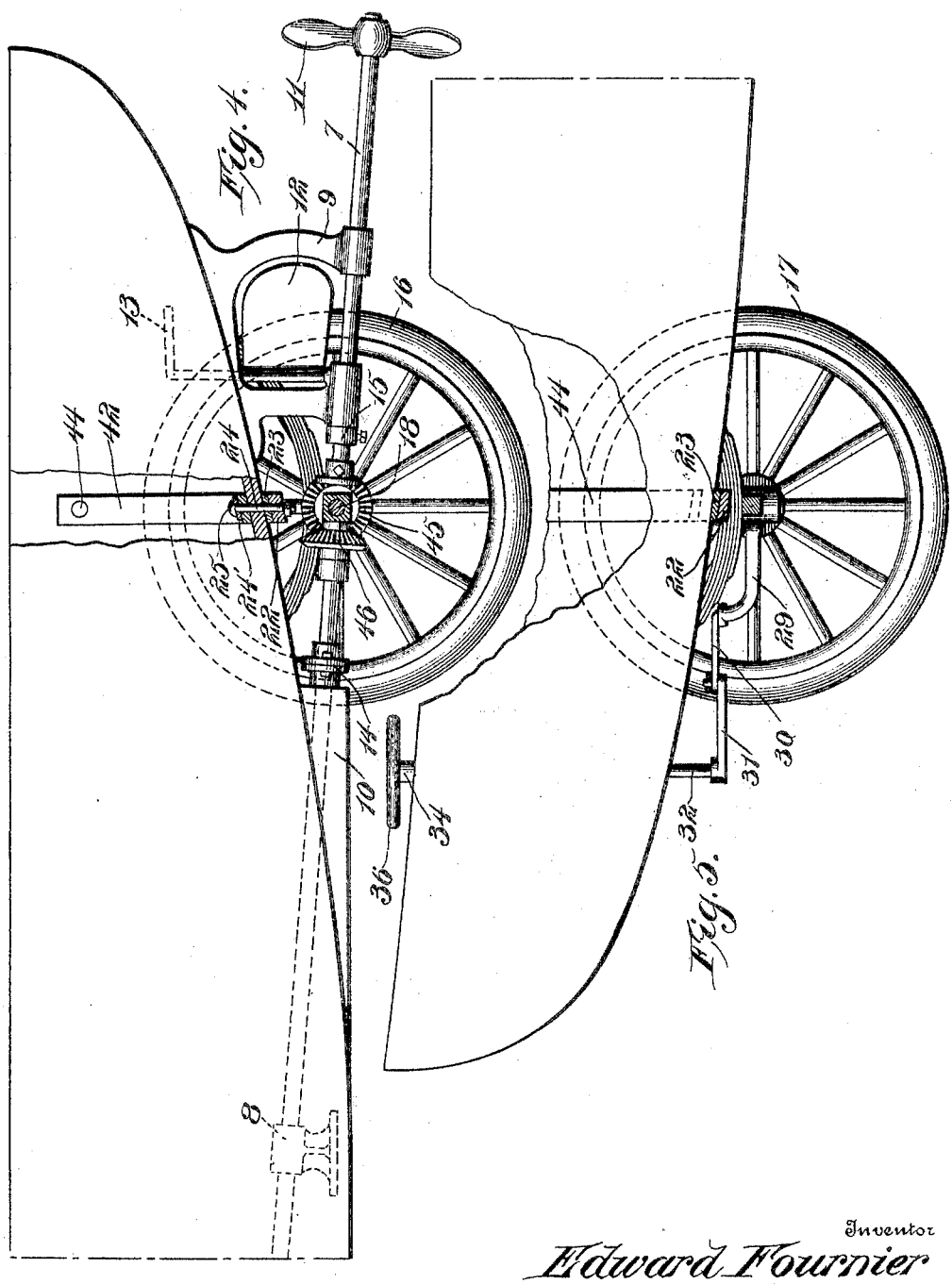

EDWARD FOURNIER, OF NORTH YAKIMA, WASHINGTON

AUTOMOBILE BOAT.

No. 802,852.        Specification of Letters Patent.        Patented Oct. 24, 1905.

Application filed March 3, 1904. Serial No. 196,350.

*To all whom it may concern:*

Be it known that I, EDWARD FOURNIER, a citizen of the United States, residing at North Yakima, in the county of Yakima and State of Washington, have invented new and useful Improvements in Automobile Boats, of which the following is a specification.

This invention relates to "automobile boats," as they are termed, the object of the present invention being to provide a combination land and water propelled vehicle, the body of which is in the form of a boat adapted to float on the surface of a body of water combined with propelling mechanism, the transmission-gear of which is adaptable to both a water-propelling device, such as a screw-propeller, or the axle of carrying-wheels upon which the boat is supported when on land.

A further object of the invention is to provide steering mechanism which is convertible for use either in connection with the carrying-wheels for land purposes or a rudder for purposes of marine navigation.

A further object of the invention is to so combine the driving-gear and steering mechanism with the carrying-wheels and body that they will perform their dual functions in an efficient and reliable manner under either use of the vehicle hereinabove referred to.

With the above and other objects in view, the nature of which will more fully appear as the description proceeds, the invention consists in the novel construction, combination, and arrangement of parts, as herein fully described, illustrated, and claimed.

In the accompanying drawings, Figure 1 is a plan view of an automobile boat embodying the present invention and shown adapted for use as a land-vehicle. Fig. 2 is an elevation of one of the axles of the land attachment, showing one of the cradles for supporting the boat-body thereon. Fig. 3 is an enlarged side elevation of a portion of the steering mechanism. Fig. 4 is a side elevation of the rear portion of the boat-body, showing the wheels, propeller and rudder, and driving-shaft. Fig. 5 is a similar view of the forward portion of the boat-body, showing a portion of the steering mechanism, &c.

Like reference-numerals designate corresponding parts in all the figures of the drawings.

Referring to the drawings, 1 designates the body of the vehicle, which is shown in the form of a boat, and said body may be sharp at both ends or pointed at one end and cut off square at the other, according to preference. The body is provided with the usual bottom 2, and, if desired, partial decks 3, under which may be arranged tanks 4 and 5 for the reception of oil or gasolene with which to supply the engine, which may be of any suitable type and run either by steam, gasolene or other oil, or electricity. The body is also shown as equipped with seats 6, which may be of any desired number and location, according to convenience and preference.

Extending backward from the engine is the main driving-shaft 7, which is set at the usual inclination, as shown in Fig. 4, and mounted in suitable bearings 8 within the boat, a hanger 9, arranged under the counter of the boat, and a stuffing-box 10, located at the point where the shaft passes through the bottom of the boat to prevent admission of water while the device is being used as a boat. The shaft is provided at the rear with an ordinary screw-propeller 11, and adjacent to the propeller is arranged a rudder 12 with a head or tiller 13, forming part of the steering mechanism. That portion of the driving-shaft 7 which is located outside of and beneath the boat-body is made detachable from the rest of the shaft adjacent to the stuffing-box 10 by means of a detachable shaft-coupling 14. This enables the rear portion of the shaft, together with the propeller, to be detached or else slid rearward in order to provide for connecting said shaft with the transmission-gear of the carrying-wheels, hereinafter more particularly described. It is also found convenient to place a movable collar 15 on the shaft 7 just in advance of the hanger 9, so that by loosening said collar the detachable portion of the shaft may be slid backward, after which the collar 15 may be tightened, thus preventing the loss of the detachable portion of the shaft and the propeller carried thereby.

The machine also comprises carrying-wheels, of which the driving-wheels are designated at 16 and the steering-wheels at 17. The driving-wheels are mounted on an axle 18, upon which are supported and fastened springs 19, connected at their upper ends, by means of spring-blocks 20, with oppositely-projecting arms 21 of a curved cradle or saddle 22. This cradle is located above the axle 18 and is shaped to conform to the shape of the outer surface of the boat, one end portion of which rests therein and is supported thereby. The upper or concave surface of the cradle is preferably lined with a cushion-strip 23, of felt, rubber, leather, or similar material, which will prevent injury to the planking of the boat. Stay-bolts 24 with round heads 25 are inserted through openings in the planking of the boat and also through the cradle 22 for the purpose of firmly securing the boat-body to the cradle, which is in turn fastened to the axle and adapted to yield, and thereby absorb all jar and vibration through the interposition of the springs 19. The forward axle is equipped with a similar cradle 26 to support the forward end portion of the boat-body, and said cradle is also mounted upon springs 27, similar to those 19 above described. The forward or steering wheels 17 are connected pivotally to the forward axle, as shown at 28, while the stub axles or spindles of the wheels 17 are provided with lever-arms 29, to which are pivotally connected rods 30, the opposite or inner ends of which are connected pivotally to a crank-arm 31 on the lower end of a steering-shaft 32. (Best illustrated in Fig. 3.) The shaft 32 extends through an opening in the bottom or keel of the boat and is mounted in a suitable bearing-bracket 33, in which it is adapted to turn. The upper portion of the shaft 32 is housed and telescoped within a tubular section 34 of the steering-shaft, which tubular section is journaled in an upper bearing-bracket 35 and provided at its upper end with a hand-wheel 36, by means of which the steering mechanism may be controlled by the operator.

Upon the lower end of the section 34 of the steering-shaft is fixedly mounted a steering-drum 37, round which passes a cable, chain, or rope which leads rearward and connects to the tiller or rudder head 13 for the purpose of swinging the rudder when the wheel 36 is turned by the operator, thus enabling the boat when used as such to be steered.

In order to house the crank-arm 31 when the machine is being used as a boat, the bottom planking or keel of the boat is mortised out or recessed to receive said crank-arm, as shown in Fig. 3, while just above the opening formed in the boat-bottom for the shaft 32 is arranged a step 38, in which the lower end of the shaft is journaled, and beneath said step is arranged a packing-washer 39, against which the hub portion of the crank-arm 31 is drawn tightly, thereby excluding water and preventing leakage. In order to draw the hub of the arm 31 upward tightly against the packing-washer, the shaft 32 is provided with a slot to receive a wedge 40, which is driven therein in the manner shown in Fig. 3, thus supporting the crank 31 and holding the hub thereof firmly against the packing-washer 39. When the crank is lowered so as to receive the steering connections 30, it is caused to rotate with the upper tubular section 34 of the shaft by means of a key 41, which passes through openings in the shaft-sections, thus causing them to turn simultaneously together.

42 and 43 represent reinforcing strips or ribs, which are secured to the inner surface of the boat sides and bottom and provided with holes 44 to receive the stay-bolts 24, by means of which the boat-body is fastened securely in the cradles 22 and 26.

The rear driving-axle 18 is equipped with transmission-gear, preferably consisting of a bevel-wheel 45 on the axle, a second bevel-wheel 46 on a detachable section 47 of the driving-shaft, and a suitable bearing-yoke 48, in which the parts are journaled. The detachable section 47 of the driving-shaft is adapted to be coupled to the forward section by means of the detachable shaft-coupling 14, which also serves to connect the propeller-section of the shaft to the forward section thereof when the device is used as a boat.

From the foregoing description it will be understood that the machine is adapted for use either as a boat on water or as a vehicle on land; also, that the same driving mechanism, including the engine and main shaft, is adaptable to the machine in either of its uses; also, that the steering-head is common to both uses of the machine. In this manner the machine as a whole is greatly simplified, the number of parts materially reduced, and the change from one form of vehicle to the other greatly facilitated and expedited. The stay-bolts 24 may be provided with suitable packing-washers 24', adapted to bear against the outer surface of the boat bottom and sides, so that by presenting the rounded heads of the bolts outward a smooth surface is presented to the water, which will not interfere with the speed of the boat, and at the same time the boat-holes are sealed against the admission of water.

Changes in the form, proportion, and minor details of construction may be resorted to without departing from the principle or sacrificing any of the advantages of the invention.

Having thus described the invention, what is claimed as new is—

1. An automobile boat having driving means, an operating-shaft connected with the driving means, driving-wheels having operating mechanism including a shaft adapted to be detachably coupled with the operating-shaft in longitudinal alinement therewith, and marine propelling means including a shaft adapted to be detachably coupled with the operating-shaft.

2. An automobile boat having an operating-shaft projecting from the hull thereof, means for rotating the shaft, supporting-wheels having driving means adapted to be connected with the operating-shaft outside the hull of the boat, and marine propelling means adapted to be detachably connected with the operating-shaft outside the hull of the boat.

3. An automobile boat comprising a boat-body, carrying-wheels and axles detachably connected therewith, a boat-propeller, transmission-gear for one of the carrying-axles, an engine mounted in the boat-body, a driving-shaft, and detachable shaft-sections associated with the boat-propeller and transmission-gear and adapted to be coupled to the main section of the driving-shaft, substantially as described.

4. An automobile boat comprising a boat-body, driving and steering wheels detachably connected therewith, a boat-rudder and a steering-shaft comprising relatively detachable sections, one of which is operatively connected with the rudder and the other end adapted to be connected with the steering-wheels, substantially as described.

5. An automobile boat comprising a boat-body, a rudder thereon, driving and steering wheels detachably connected with the boat-body, and a steering-shaft comprising telescopic members one of which passes through the bottom of the boat and is adjustable up and down, suitable packing arranged to seal the opening in the boat-bottom through which said shaft passes when the lower shaft-section is raised, means for connecting and disconnecting the shaft-sections whereby they are adapted to rotate together or independently, and means on said shaft for actuating suitable connections leading to the rudder and steering-wheels.

6. An automobile boat comprising a boat-body, a rudder thereon, driving and steering wheels detachably connected to the boat-body, and a steering-shaft common to both the rudder and steering-wheels, said shaft comprising telescopic sections, one of which passes through the bottom of the boat and is provided at its lower end with a crank-arm, a step through which the lower shaft-section passes, a packing-washer or gasket interposed between the hub of said crank-arm and the step, a wedge engaging the lower shaft-section and bearing against the step for holding the hub of the crank-arm against the packing-washer or gasket when lifted, and means for connecting and disconnecting the shaft-sections so as to cause them to rotate together or allow them to rotate independently.

7. An automobile boat comprising a boat-body, a rudder thereon, driving and steering wheels detachably connected therewith, and a steering-shaft common to both the rudder and steering-wheels, said shaft comprising telescopic sections, the lower one of which is provided with a crank-arm and the upper one of which is provided with a hand-wheel, a steering-drum on the upper section, means for connecting and disconnecting the shaft-section for simultaneous or independent rotation, a step within the boat through which the lower shaft-section passes, a gasket interposed between said step and the hub of the crank-arm, and means for holding the hub of the crank-arm tightly against said gasket, the bottom of the boat being mortised or recessed on the outside to receive the crank-arm, substantially as and for the purpose set forth.

8. An automobile boat comprising a boat-body, an engine therein, driving and steering wheels detachably connected with the boat-body, marine propelling means connected with the boat-body, means for connecting the engine with the driving-wheels, or with the marine propelling means, steering mechanism connected with said boat-body, marine steering means connected with said boat-body, and means for connecting said steering mechanism with either the steering-wheels or the marine steering means.

In testimony whereof I affix my signature in presence of two witnesses.

EDWARD FOURNIER.

Witnesses:
  C. M. JOHNSON,
  R. K. NICHOLS.